United States Patent Office 3,598,872
Patented Aug. 10, 1971

3,598,872
O-CHLORINATED-PHENOXYACETYL-N,N-DIETHYLHYDROXYLAMINE
Rudi F. W. Rätz, deceased, late of Hamden, Conn., by Margot I. H. Rätz, executrix, Hamden, Conn., and Miriam J. Gruber, Dover, N.J., assignors to The Ansul Company
No Drawing. Filed Apr. 8, 1968, Ser. No. 719,778
Int. Cl. C07c 97/10
U.S. Cl. 260—568                                   4 Claims

ABSTRACT OF THE DISCLOSURE

Diethylamino esters of various chlorinated phenoxyacetic acids are prepared by the reaction of chlorinated phenoxyacetyl chlorides with N,N-diethylhydroxylamine in diethyl ether and in the presence of an acid acceptor. These compounds are highly effective herbicides.

---

This invention relates to compounds having excellent herbicidal properties, and more particularly to diethylamino esters of chlorinated phenoxyacetic acids having the formula

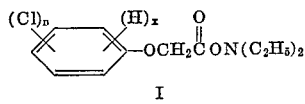

I wherein $n$ is 1 to 5 and $x$ is 1 to 5 with the proviso that $n+x$ is 5.

The herbicidal Compounds I of this invention are conveniently prepared by the reaction of the appropriate chlorinated phenoxyacetyl chloride with N,N-diethylhydroxylamine in the presence of anhydrous diethyl ether and an acid acceptor, e.g., pyridine. Preferably, a solution of the chlorinated phenoxyacetyl chloride in anhydrous diethyl ether is added to a cooled solution of N,N-diethylhydroxylamine and acid acceptor in anhydrous diethyl ether.

Chlorinated phenoxyacetyl chlorides suitable for use in the preparation of Compounds I include p-chlorophenoxyacetyl chloride; m-chlorophenoxyacetyl chloride; 2,4-dichlorophenoxyacetyl chloride; 2,5 - dichlorophenoxyacetyl chloride; 2,4,5-trichlorophenoxyacetyl chloride; 2,3,5-trichlorophenoxyacetyl chloride and isomers thereof.

The herbicidal Compounds I are readily obtained in high yield and excellent purity and are conveniently isolated from the reaction mixture by conventional techniques such as filtration, evaporation, crystallization, and the like.

The Compounds I of this invention are particularly valuable agricultural chemicals. Thus, as previously indicated, they exhibit strong herbicidal activity. Generally, they are mixed with various adjuvants in these applications and low concentrations of the compound are extremely effective.

For example, they are excellent post-emergence herbicides. Thus, p-chlorophenoxyacetic acid, diethylamino ester was 80% effective in controlling mustard at a rate of application of 20 pounds per acre while 2,4-dichlorophenoxyacetic acid, diethylamino ester and 2,4,5-trichlorophenoxyacetic acid, diethylamino ester were 100% effective in controlling mustard and pigweed at a rate of application of 1 pound per acre.

Compounds I are also valuable pre-emergence herbicides as indicated by the control of crabgrass, mustard and pigweed by 2,4-dichlorophenoxyacetic acid, diethylamino ester and 2,4,5-trichlorophenoxyacetic acid, diethylamino ester.

The following examples will serve to illustrate the preparation of various Compounds I in accordance with the practice of this invention.

EXAMPLE 1

To a cooled solution of 4.0 g. (0.0427 mole) of N,N-diethylhydroxylamine and 3.4 g. (0.0427 mole) of pyridine in 30 ml. of anhydrous diethyl ether was added dropwise, with stirring, a solution of 8.8 g. (0.043 mole) of p-chlorophenoxyacetyl chloride in 50 ml. of diethyl ether. Separation of solid from the reaction mixture began immediately. Stirring, with cooling, was continued for one hour. After standing overnight, the separated pyridine hydrochloride had become sticky and unfilterable. The ethereal solution was decanted and the residue washed with additional ether and then dried in vacuum, thereby obtaining 5.5 g. of pyridine hydrochloride. The ether solution was extracted twice with 5% sodium carbonate solution and then three times with water to provide 8.0 g. of a clear amber oil; $n_D^{20}$ 1.5194. The following analytical data revealed that p-chlorophenoxyacetic acid, diethylamino ester had been obtained.

*Analysis.*—Calcd. for $C_{12}H_{16}ClNO_3$ (percent): C, 55.92; H, 6.26; Cl, 13.76. Found (percent): C, 56.50; H, 6.02; Cl, 14.16.

EXAMPLE 2

To a cooled, stirred solution of 4.0 g. (0.0427 mole) of N,N-diethylhydroxylamine and 3.4 g. (0.0427 mole) of pyridine in 30 ml. of anhydrous diethyl ether was added dropwise a solution of 10.2 g. (0.0427 mole) of 2,4-dichlorophenoxyacetyl chloride in about 40 ml. of diethyl ether. Separation of a fine, light colored solid began immediately. The mixture was stirred, with cooling, for 35 minutes after the addition was completed and then filtered to remove the formed pyridine hydrochloride. Then the ether was removed from the filtrate by rotary evaporation at reduced pressure, thereby obtaining 11.3 g. of an amber colored oil. This oil, which had an amine odor and a tendency to become viscous, was redissolved in ether and extracted twice each with water and sodium carbonate solution. The ether layer was dried over sodium carbonate, treated with charcoal and filtered. Removal of the ether from the filtrate by rotary evaporation at reduced pressure provided 5.4 g. of amber liquid. The following analytical data revealed that 2,4-dichlorophenoxyacetic acid, diethylamino ester had been obtained.

*Analysis.*—Calcd. for $C_{12}H_{15}Cl_2NO_3$ (percent): C, 49.33; H, 5.18; Cl, 24.27. Found (percent): C, 49.06; H, 5.03; Cl, 25.09.

EXAMPLE 3

To a cooled stirred solution of 4.0 g. (0.0427 mole) of N,N-diethylhydroxylamine and 3.4 g. (0.0427 mole) of pyridine in about 25 ml. of anhydrous diethyl ether was added dropwise a filtered solution of 11.7 g. (0.0427 mole) of 2,4,5-trichlorophenoxyacetyl chloride in about 60 ml. of ether. The separation of a white solid began immediately. The reaction mixture was stirred, with cooling, for thirty minutes after completion of the addition. After standing overnight the reaction mixture was filtered to separate the formed pyridine hydrochloride. The ether was removed from the filtrate by rotary evaporation at reduced pressure, thereby providing 7.0 g. of a cream colored solid. Recrystallization of this solid from about 100 ml. of ligroin provided 5.7 g. of cream colored powder. The following analytical data revealed that 2,4,5-trichlorophenoxyacetic acid, diethylamino ester had been obtained.

*Analysis.*—Calcd. for $C_{12}H_{14}Cl_3NO_3$ (percent): C, 44.13; H, 4.32; Cl, 32.57. Found (percent): C, 44.17; H, 4.29; Cl, 32.38.

What is claimed is:
1. A compound having the formula

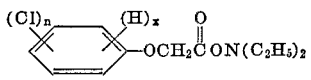

wherein $n$ is 1 to 5 and $x$ is 1 to 5 with the proviso that $n+x$ is 5.

2. The compound of claim 1 having the name p-chlorophenoxyacetic acid, diethylamino ester.

3. The compound of claim 1 having the name 2,4-dichlorophenoxyacetic acid, diethylamino ester.

4. The compound of claim 1 having the name 2,4,5-trichlorophenoxyacetic acid, diethylamino ester.

References Cited

UNITED STATES PATENTS

| | | | |
|---|---|---|---|
| 2,596,089 | 5/1952 | Allen | 260—473 |
| 2,945,056 | 7/1960 | Horsley et al. | 260—473 |
| 3,005,016 | 10/1961 | Young | 260—473 |
| 3,439,018 | 4/1969 | Brookes et al. | 260—473 |
| 3,446,613 | 5/1969 | Berliner et al. | 260—473 |

ROBERT V. HINES, Primary Examiner

U.S. Cl. X.R.

121—71